C. C. CARPENTER.
STORAGE BATTERY SEPARATOR.
APPLICATION FILED APR. 12, 1918.
1,324,954.
Patented Dec. 16, 1919.
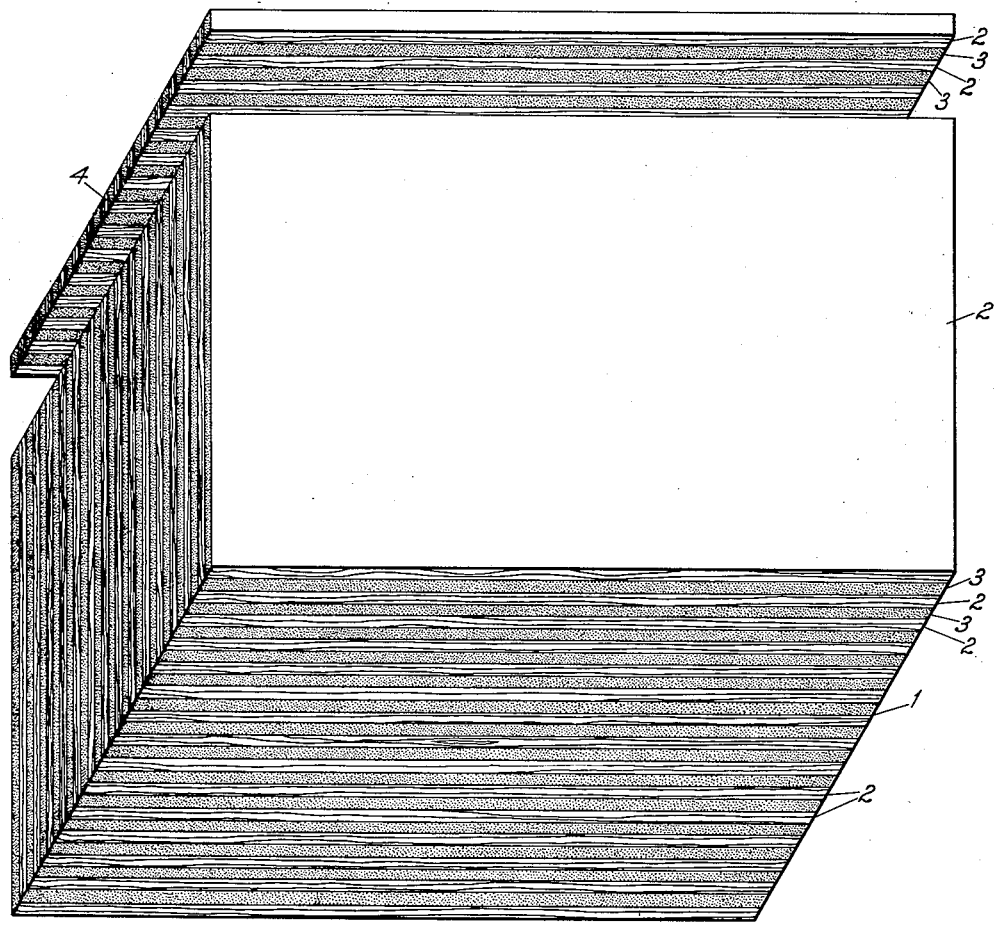
WITNESS:
INVENTOR.
Campbell C. Carpenter.
BY
ATTORNEY.

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY SEPARATOR.

1,324,954.      Specification of Letters Patent.     Patented Dec. 16, 1919.

Application filed April 12, 1918. Serial No. 228,091.

*To all whom it may concern:*

Be it known that I, CAMPBELL C. CARPENTER, a citizen of the United States, residing at Niagara Falls, in the county of Niagara and State of New York, have invented new and useful Improvements in Storage-Battery Separators, of which the following is a specification.

The present invention relates to storage battery separators.

More particularly the present invention relates to storage battery separators and methods for making same.

One of the objects of the present invention is to provide an improved separator which will permit the circulation of the electrolyte in the storage battery while preventing treeing across from a plate of one polarity to an adjacent plate of opposite polarity.

The present invention also has for one of its objects the provision of a storage battery separator which may be manufactured cheaply and expeditiously.

A further object is to provide an improved method for manufacturing storage battery separators.

Further objects will be apparent as the description proceeds.

The one figure of the drawings shows a storage battery separator together with a block from which said separator has been sliced.

The numeral 1 represents a composite block made up of a number of layers of wood or other fibrous material. The block 1 is made up of alternate layers having their fibers transversely arranged. That is to say, every second layer will have its fibers extending in substantially the same direction, while the intermediate layers will have their fibers arranged substantially in a direction normal to the fibers of the first mentioned layers. As will be apparent from the drawing, layers 2, 2, have their fibers arranged horizontally, while the intermediate layers 3, 3, have their fibers extending vertically. The various layers 2, 3, will be securely cemented together under pressure. For this purpose any preferred glue or cement may be used. At present, I prefer to use bakelite or similar phenol condensation product.

After the layers 2, 3, have been cemented into a block, the separators will be sliced therefrom. For this purpose a saw may be used. One of the separators which has been sliced from the block 1 is indicated by the numeral 4.

It will be apparent that a separator is provided having a plurality of sections of fibrous material having the fibers extending transversely of the separator. In the figure, said sections are constituted by the layers 3, 3. The sections 3, 3, are separated by the sections 2, 2, whose fibers extend in the direction of their length. Layers 2, 2, will provide strength, while the layers 3, 3, will permit circulation of the electrolyte. It will be apparent that the layers 2, 2, need not be of the same thickness as the layers 3, 3. In practice it may be preferred to make the layers 2, 2, of relatively thin tough wood, whereby the proportion of the separator having transversely extending fibers will be a maximum while the strength of the separator is preserved.

One embodiment of the present invention is described in detail. Many modifications will occur to those skilled in the art. It is intended in this patent to cover all such modifications that come within the scope of the invention as defined by the appended claims.

What I claim as new and desire to secure by Letters Patent of the United States, is—

1. The method of making separators which consists of cementing together thin layers of wood to form a block, the fibers of alternate layers being crossed, and slicing said block into sheets along planes substantially normal to the fibers of certain of said layers.

2. A battery separator comprising strips of fibrous material having their fibers arranged transversely of said separator, and strips of fibrous material arranged alternately with said first mentioned strips, supporting said first mentioned strips and having its fibers arranged substantially normal to the fibers of said first mentioned strips.

3. A battery separator comprising strips of fibrous material, certain of said strips having their fibers extending in the direction of their length, the remainder of said strips being arranged alternately with the other strips and having their fibers extending transversely of the separator.

4. A block for providing storage battery separators comprising layers of wood, certain of said layers having their fibers extending in one general direction, the fibers of intermediate layers extending in a direction substantially normal to said first mentioned direction.

5. A block for providing storage battery separators comprising layers of wood, certain of said layers being of relatively tough and relatively thin material and having their fibers extending in one general direction, intermediate layers being relatively porous and having their fibers extending in a direction substantially normal to said first mentioned direction.

6. A battery separator comprising strips of fibrous material, certain of said strips being of relatively thin tough material and having their fibers extending in the direction of their length, the remainder of said strips being arranged alternately with the other strips and having their fibers extending transversely of the separator.

In witness whereof I have hereunto subscribed my name.

CAMPBELL C. CARPENTER.